United States Patent
Massie et al.

(10) Patent No.: US 6,344,225 B1
(45) Date of Patent: Feb. 5, 2002

(54) GENERATION AND STABILIZATION OF PREFERRED BEEF TALLOW FLAVORS IN FRYING OILS

(75) Inventors: Cecil T. Massie, Bloomington; David A. Schuh, Burnsville, both of MN (US); Gena San Buenaventura, Makati (PH); Dorothy J. Muffet, Plymouth, MN (US)

(73) Assignee: Source Food Technology, Inc, Minneapolis, MN (US)

( * ) Notice: Subject to any disclaimer, the term of this patent is extended or adjusted under 35 U.S.C. 154(b) by 0 days.

(21) Appl. No.: 09/182,507

(22) Filed: Oct. 30, 1998

Related U.S. Application Data
(60) Provisional application No. 60/063,591, filed on Oct. 30, 1997.

(51) Int. Cl.[7] ................................................. A23D 9/02
(52) U.S. Cl. .................... 426/330.6; 426/438; 426/523; 426/608; 426/574
(58) Field of Search ................................ 426/608, 523, 426/438, 574, 330.6

(56) References Cited

U.S. PATENT DOCUMENTS

| | | |
|---|---|---|
| 5,073,398 A | 12/1991 | Kuss |
| 5,104,678 A | 4/1992 | Yang |
| 5,169,670 A * | 12/1992 | Yang ........................... 426/607 |
| 5,382,442 A | 1/1995 | Perlman et al. |
| 5,436,018 A | 7/1995 | Massie et al. |
| 5,514,407 A | 5/1996 | Perlman et al. |
| 5,624,703 A | 4/1997 | Perlman et al. |

OTHER PUBLICATIONS

Um 1992 J Agric Food Chem 40(9)1641–1646.*
Ha 1991 J. American Oil Chemist Society 68(5) 294–298.*
Takeoka 1997 J Agric Food Chem 45(8)3244–3249.*
Fetch 1987 J American Oil Chemist Society 64(6) 789–799.*
Swern 1979 Bailey's Industrial Oil and Fat Products John Wiley & Sons New York p 342–352.*
Suram and Hartman 1989 Food Technology 43(6) 90–94.*
Handel 1990 J Food Science 55 (5) 1417–1420.*
De Foew 1981 J Food Science 46(2) 452–456.*

* cited by examiner

*Primary Examiner*—Carolyn Paden
(74) *Attorney, Agent, or Firm*—Foley & Lardner

(57) ABSTRACT

A frying oil is described which produces fried foods exhibiting a highly preferred flavor profile and flavor stability over the life of the oil. The invention includes a beef tallow fraction containing an effective amount of beef tallow stearin fraction and an effective amount of beef tallow volatiles such that upon heating is produced a flavor profile which is highly preferred in fried foods.

12 Claims, No Drawings

GENERATION AND STABILIZATION OF PREFERRED BEEF TALLOW FLAVORS IN FRYING OILS

This application claims benefit to provisional application Ser. No. 60/063,591 filed Oct. 30, 1997.

BACKGROUND OF THE INVENTION

The area of this invention is the preparation and use of a frying oil which produces a highly preferred flavor profile in fried foods while providing optimum fry life stability in a beef tallow containing frying oil.

Kuss (U.S. Pat. No. 5,073,398) teaches that desirable flavor compounds in beef tallow are a low boiling volatile fraction which can be transferred from beef tallow to vegetable oil by passing a carrier gas first through the tallow at a temperature of 150° F. or greater and then through a vegetable oil. The resulting beef tallow flavored vegetable oil lost the beef tallow flavor after brief period of use, however, demonstrating that the volatile constituents themselves do not provide long lasting flavor enhancement.

Yang (U.S. Pat. No. 5,104,678) teaches that the flavor compounds of beef tallow arise from minor unsaturated fatty acid constituents. To isolate the effect of these fatty acids, Yang isolated the fatty acids, reconstituted the triglyceride and then deodorize the resulting triglyceride. The resulting product is said to develop beef tallow flavors upon heating. It would seem reasonable that these minor fatty acids would exert their flavor development in their natural state. The present inventors have found, however, that well deodorized beef tallow does not develop a preferred flavor profile when heated.

SUMMARY OF THE INVENTION

A particular challenge in the formulation of frying oils is that initial oil flavor may quickly degenerate to a highly undesirable flavor. Unlike most other oil uses, a frying oil must maintain its flavor over a period several days under highly adverse conditions of high temperature, exposure to oxygen and introduction of pro-oxidants from the foods being fried. Under these circumstances, it has become common practice in the edible oil industry to measure the oxidative stability of frying oil using such methods as Active Oxygen Method or the Oxidative Stability Index as a surrogate for the flavor stability of the oil. Remarkably the present inventors have learned that maximum flavor stability and intensity in beef tallow containing frying oils can be achieved by reducing the oxidative stability of a frying oil slightly and that such changes can be directed by careful control of the composition of the tallow fraction.

DETAILED DESCRIPTION OF THE INVENTION

Composition of beef tallow:

Beef tallow is comprised of volatile fractions and non-volatile fractions. The volatile fractions may be further characterized as low boiling (recovered under vacuum at 100 to 200° F.) mid boiling (recovered under vacuum at temperatures up to 350° F) and high boiling (recovered at temperatures up to about 450° .F). Taken collectively, the volatile fractions in beef tallow are present at about 4000 parts per million (hereafter "PPM"). Each of these fractions is highly complex and is comprised of scores if not hundreds of compounds.

The non-volatile fraction of beef tallow may be characterized as being composed of stearin fraction, (solid at greater than 50° F.) and an olein fraction (liquid at 50° F.) and an olein fraction (liquid at 50° F.). In general beef tallow is comprised of about 50% each of stearin and olein fractions.

Despite extensive investigation, the present inventors have not found any of the volatile fractions to be the sole or even primary source of the highly preferred flavor profile and for the balance of this discussion "beef tallow volatiles" are referred to as a group and in approximately the relative concentrations as occur naturally.

The physical and chemical properties of the low boiling volatile fraction are quite remarkable given that it originates in a fat. The fraction is water soluble, highly polar, and disperses only with great difficulty in fat. In addition, if the fraction is added drop wise to hot oil, it will sink to the bottom without dispersing and turn blood red. Significantly, beef tallow on heating will develop a similar red color which means that a portion of this fraction reacts with itself during normal use. Presumably it is this low boiling fraction which Kuss was able to transfer from the beef tallow into vegetable oil using an inert carrier gas. As noted previously, however, Kuss found the flavor from this fraction did not persist. The inventors believe the observed self reaction explains the rapid disappearance of the flavor. The flavor loss is not caused by evaporation or absorption onto the fried food. Rather, the inventors believe the rapid disappearance is caused by reactions of the beef tallow volatiles which convert them to neutral or even off-flavor compounds.

Firstly, in contrast to earlier investigators, the inventors believe the desirable flavor profile in beef tallow products is formed during the heating process by reaction of the volatile and non-volatile components with each other. At the same time the same constituents responsible for the favorable flavors are also contributing to undesirable side reactions.

The volatile fraction is a pro-oxidant and competes to form undesirable flavors and otherwise degrade the oil as is readily observed by measuring the oxidative stability of the oil. Even so, optimum flavor formation and persistence is achieved by sacrifice of a portion of the oil stability. Remarkably, the inventors have found a narrow optimum composition in which there is maximal benefit in flavor intensity and flavor stability with minimal sacrifice of oil fry life and stability.

When the volatile fraction is essentially completely absent, the oil achieves maximum oxidative stability but full flavor development fails to occur and a preferred flavor in fired foods is not obtained.

When the volatile fraction is present at high concentrations, the flavor intensity is initially high but degrades quickly over time as the pro-oxidative properties overwhelm the desirable flavor characteristics and/or the volatiles self-react to form neutral or undesirable compounds.

Even at very low concentrations the volatile fraction both promotes flavor formation and oxidation of the oil. Over a narrow range of volatile concentrations, however, the favorable flavor development outweighs, but does not prevent the loss of oxidative stability. Nevertheless, the beneficial flavor development which occurs persists over the useful life of the oil. This is our understanding the first evidence that flavor stability and overall oil stability can be made to move independently.

When the stearin fraction is absent, the flavor profile is similarly hampered and fails to develop a preferred profile. This is particularly remarkable since Yang teaches that the unsaturated minor fatty acids are the source of beef tallow flavor but the stearin fraction is the more saturated portion of beef tallow and one would expect the olein fraction to be more not less responsive to flavor development if the Yang hypothesis is correct. Further, since the beef tallow olein fraction has been specifically processed to remove the stearin fraction, it would not be obvious to recombine a portion of the stearin fraction in order to stabilize the flavor of beef tallow volatiles.

In the first aspect the invention is frying oil which produces fried foods exhibiting a highly preferred flavor profile and flavor stability over the life of the oil. The invention comprises a beef tallow fraction containing an effective amount of beef tallow stearin fraction and an effective amount of beef tallow volatiles such that upon heating is produced a flavor profile which is highly preferred in fried foods. Optionally, a vegetable oil fraction may be added in the manner of U.S. Pat. No. 5,624,703 and/or antioxidants and antifoam agents to provide enhanced oxidative stability. The production of beef tallow stearin fractions and beef tallow volatiles is known per se.

The tallow fraction of the frying oil is comprised of from about 50 to 400 PPM and preferably from about 100 to 300 PPM beef tallow volatiles and necessary and sufficient beef stearin fraction of at least about 2% of the total tallow weight. The balance of the tallow fraction may be comprised of beef tallow olein.

Vegetable oils suitable for incorporation with such a blend may be selected from the group consisting of soy oil, cottonseed oil, corn oil, safflower oil, sunflower oil, peanut oil, canola oil, and olive oil.

A further aspect of this invention is a method for preparation of fried foods having highly preferred flavor profile, the improvement comprising frying french fries, onion rings and similar fried foods in the frying oil described above.

In a still further aspect of this invention is a method for stimulating the formation of favorable flavor compounds from the non-volatile fraction of beef tallow by the combination of from 50 to 400 PPM of beef tallow volatiles and a necessary and sufficient beef tallow stearin fraction of from about 2% to about 7.5% of the total tallow fraction followed by heating in the presence of air to a temperature in excess of about 300° F.

In a highly preferred formulation of this product, the preponderance of tallow fraction may be processed to thoroughly deodorize and cholesterol strip the tallow fraction as described in U.S. Patent No. 5,436,018. Beef tallow volatiles may be provided expeditiously by blending undeodorized tallow into volatile-free tallow at such ratios as required to provide the required volatiles concentration. Since the resulting product contains only a small fraction of the original cholesterol concentration, in addition to having a highly favorable flavor, the oil remains nearly cholesterol free.

In a further preferred formulation the cholesterol stripped tallow as described in U.S. Pat. No. 5,436,018 may be combined with vegetable oil as described in U.S. Pat. Nos. 5,382,442;5,514,407; and 5,624,703 to form a highly oxidation resistant base stock to which undeodorized tallow may be added to achieve the desired volatiles content. This highly stable base stock is especially suitable as a carrier for the favorable flavors formed upon heating.

Each of the foregoing patents and cited references is incorporated herein in its entirety by reference to the same extent as if it were incorporated by reference individually.

What is claimed is:

1. A beef tallow fraction comprising from about 2% to about 7.5%, non-volatile beef tallow stearin fraction and 50 to 400 PPM of beef tallow volatiles, substantially free from other components of beef tallow.

2. The fraction of claim 1 further comprising a vegetable oil fraction.

3. The fraction of claim 2 wherein the vegetable oil is selected from the group consisting of soy oil, cottonseed oil, corn oil, safflower oil, sunflower oil, peanut oil, canola oil, and olive oil.

4. The fraction of claim 1 further comprising an antioxidant, an antifoam agent or a combination theref.

5. The fraction of claim 1 wherein the amount of beef tallow volatiles is about 50 to 400 PPM.

6. The fraction of claim 1 wherein the amount of beef stearin fraction is at least about 2% of the total fraction weight.

7. The fraction of claim 1 further comprising beef tallow olein.

8. A frying oil comprising the fraction of claim 1.

9. In a method for preparing fried foods, the improvement comprising frying food in a frying oil of claim 8.

10. A method for stimulating the formation of favorable flavor compounds from a non-volatile fraction of beef tallow comprising combining from 50 to 400 PPM of beef tallow volatiles and a non-volatile beef tallow stearin fraction in an amount from about 2% to about 7.5% of total beef tallow followed by heating in the presence of air to a temperature in excess of about 300° F.

11. The method of claim 10 wherein the beef tallow components are cholesterol-stripped.

12. A beef tallow fraction consisting essentially of an effective amount of from about 2% to about 7.5%, non-volatile beef tallow stearin fraction and 50 to 400 PPM of purified beef tallow volatiles.

* * * * *